Patented Mar. 12, 1940

2,193,742

UNITED STATES PATENT OFFICE 2,193,742

GLASS SUBSTITUTE AND PROCESS OF PREPARING

Otto Röhm and Walter Bauer, Darmstadt, Germany, assignors to Röhm & Haas Company, Philadelphia, Pa.

No Drawing. Application July 2, 1934, Serial No. 733,518. In Germany October 26, 1928

2 Claims. (Cl. 88—54)

This invention relates to the manufacture of glass substitutes from polymerizable unsaturated organic compounds, particularly the derivatives of methacrylic acid alone or in mixture of each other with other polymerizable substances.

These substances can be polymerized by the action of light, heat and/or of catalysts such as organic and inorganic peroxides, oxygen, etc., to yield colorless, transparent materials which are eminently suited for use as substitutes for glass in many of its applications. The polymerized material may be manufactured in any desired form so that it may be substituted for glass in windows, automobile windshields, lenses for optical instruments, eyeglasses, goggles etc. On account of its low specific gravity as compared with ordinary glass, it is very suitable for making window lights for aircraft.

It has been found that the polymerized esters of acrylic and methacrylic acids vary considerably in hardness. Generally speaking, the polymerization products of the esters of methacrylic acid are harder than those of the corresponding esters of acrylic acid, and the hardness in both series decreases as the number of carbon atoms in the alcohol radical of the ester is increased. Thus polymerized methyl methacrylate is the hardest of all these materials, and consequently is best suited as a substitute for glass for those purposes where hardness is the prime requisite. Where the greatest hardness is not necessary, the polymerized methyl methacrylate may be modified by the addition of suitable plasticizers or other polymerized products such as the esters of acrylic acid or the higher esters of methacrylic acid. When more than one ester of acrylic or methacrylic acid is used, they may be mixed after polymerization but preferably the monomeric substances are mixed and then subjected jointly to polymerizing influences. The materials obtained in this way are superior to those obtained by mixing the polymerized materials. For making sheets of this material for use as window glass substitutes, it may be first dissolved in a suitable solvent and then poured out in a large flat container and the solvent evaporated. After the evaporation of the solvent, the sheet may be ground and polished if necessary and cut to any desired size. For making lenses for goggles, etc., a thin sheet may be prepared as above and the lenses cut from this sheet. If the use of a solvent is objectionable for any reason, the molten material may be poured on a hot surface and allowed to cool and then treated as above for the preparation of window lights or lenses. Especially clear glass substitutes are obtained when the monomeric or the partially polymerized substances are polymerized at as low a temperature as is practical and with the use of only very small amounts of catalyst.

Lenses for optical purposes may be made in several ways such for instance, as cutting slugs from sheets of the material and then either grinding them and polishing directly or the slug may be placed in a mold of suitable dimensions and heated under pressure until it attains the shape of the mold. After removal from the mold, it may be ground and polished if necessary. Lenses may also be made by placing powdered polymerized material of this type in a mold and forming it under the action of heat and pressure. Slugs of suitable size for molding may also be made by extruding the polymerized material through a die and cutting the rod so made to the proper length for use in the mold.

This material has many advantages over ordinary glass. It is considerably more transparent to ultra violet light. It is not brittle and therefore cannot be so easily broken by shock or blow. It will not crack when exposed to sudden and uneven changes of temperature. Its index of refraction varies according to the nature of the monomeric substances employed, and this may be adjusted to suit any purposes by the addition of other materials, having a different index of refraction. Because of this, a system of lenses may be built up which can be corrected for both spherical and chromatic aberration, in a manner similar to that prevalent in the fabrication of glass lenses.

In order to illustrate the invention, the following examples are given but it is understood these do not limit the invention in any way to the specific materials or mixtures given, since the invention may be otherwise practiced within the scope of the appended claims:

*Example 1.*—Monomeric ethyl methacrylate or partially polymerized ethyl methacrylate is heated to about 70° C. until polymerization is complete. If desired a small amount of catalyst such as benzoyl peroxide, for instance 0.03% may be added to the monomeric substance before polymerization. The polymerization product thus obtained may be used as a substitute for window glass, lenses for spectacles, goggles, etc.

*Example 2.*—A mixture of 60 parts of methyl methacrylate and 40 parts of ethyl acrylate is polymerized as in Example 1. The sheet thus obtained may be used in the same way as the product of Example 1, but the material is somewhat softer.

Example 3.—A lens suitable for optical work may be molded as follows:

Methyl-methacrylate is polymerized and reduced to a powder in any desired manner. This powder is then placed in a mold of suitable dimensions and pressed under a pressure of about 1000 pounds per square inch at a temperature of about 120 to 130° C. After cooling the finished article may be removed from the mold and if necessary may be ground and polished to the exact dimensions desired.

Example 4.—The sheet obtained in Example 1 or 2 is cut into slugs and is heated under pressure in a mold as in Example 3. The finished article may then be ground and polished.

In case it is desired to vary the properties of the materials obtained in any of the foregoing examples for any special purpose, such for instance as to make a more flexible sheet for use in side curtains for automobiles or other places where a flexible transparent material is desired, or to change the optical properties in the case of lenses, other substances may be mixed with the polymer before, during or after polymerization. Softening materials which may be used are the esters of phthalic acid, tartaric acid, phosphoric acid, etc., all of which will change both physical and optical properties of the polymerized material.

Other polymerizable derivatives of methacrylic acid may also be used, such as the nitriles, chlorides, anhydrides, amids, and even in some cases the acids themselves. Besides the aliphatic esters of methacrylic acids, the phenyl, benzyl, and other such esters may also be used for making the polymerized material.

The greater transparency of these materials for ultra violet light as compared with that of glass may be seen from the fact that a sheet of polymerized methyl methacrylate containing 0.5 part of paraffin oil, 3 mm. thick, will transmit light having a wave length of 2750 Angstrom units, whereas ordinary glass of equal thickness will not transmit light having a wave length less than about 2970 Angstrom units. A mercury vapor lamp was the source of light employed in making these measurements. The above mixture of polymethyl methacrylate and paraffin oil had a refractive index of 1.485.

The especially hard kinds of the glass substitute so as the poly-methyl-methacrylate may be used also for coating of softer qualities of glass substitute.

We claim:

1. A lens for correcting defective vision comprising a polymerized lower alkyl ester of methacrylic acid.

2. A lens for correcting defective vision consisting essentially of polymerized methyl methacrylate.

OTTO RÖHM.
WALTER BAUER.